United States Patent [19]
Niekamp et al.

[11] Patent Number: 4,634,472
[45] Date of Patent: Jan. 6, 1987

[54] ENRICHMENT OF FRUCTOSE SYRUPS

[75] Inventors: Carl W. Niekamp, Forsyth; James D. Wideman, Decatur, both of Ill.

[73] Assignee: A. E. Staley Manufacturing Company, Decatur, Ill.

[21] Appl. No.: 768,892

[22] Filed: Aug. 23, 1985

[51] Int. Cl.$^4$ .............................................. F24C 1/00
[52] U.S. Cl. ........................................ 127/60; 127/42
[58] Field of Search .......................... 127/42, 43, 60, 58

[56] References Cited

U.S. PATENT DOCUMENTS

| | | | |
|---|---|---|---|
| 3,506,486 | 4/1970 | Ganiaris | 127/60 |
| 3,704,168 | 11/1972 | Hara et al. | 127/58 |
| 4,199,374 | 4/1980 | Dwivedi et al. | 127/60 |
| 4,371,402 | 2/1983 | Kubota | 127/60 |
| 4,395,292 | 7/1983 | Katz | 127/29 |
| 4,488,912 | 12/1984 | Milch et al. | 127/43 |

FOREIGN PATENT DOCUMENTS 2087400  5/1984  United Kingdom ................. 127/60

*Primary Examiner*—R. B. Penland
*Attorney, Agent, or Firm*—Michael F. Campbell; James B. Guffey; Philip L. Bateman

[57] ABSTRACT

A process for manufacturing an enriched fructose syrup, which is characterized in that dextrose is crystallized from a relatively high solids feed syrup containing fructose and dextrose and then another relatively dilute (or lower solids) fructose containing diluent syrup is added to enhance separation of the dextrose crystals from the mother liquor.

Process can be adjusted to yield dextrose monohydrate or anhydrous alpha dextrose crystalline product in addition to an enriched fructose syrup.

15 Claims, No Drawings

ENRICHMENT OF FRUCTOSE SYRUPS

FIELD OF THE INVENTION

The present invention relates generally to the manufacture of an enriched fructose syrup and, in a particularly preferred embodiment, it relates to the manufacture of a syrup having more than 55 percent fructose on a dry solids basis.

BACKGROUND OF THE INVENTION

The manufacture of fructose containing syrup has been known for many years and, generally, such manufacture has been accomplished in two principal ways. In accordance with one way, a sucrose solution is hydrolyzed to prepare an invert sugar syrup. Another way is to treat dextrose with an isomerase enzyme or alkali so as to convert glucose to fructose by an enzyme or alkali isomerization process. Such processes, however, provide syrups usually containing less than about 50 percent fructose on a dry solids basis (d.s.b.). It is known to take these fructose containing syrups and increase the level of fructose by a chromatographic fractionation process. Such process is widely used in the industry to provide syrups containing 55 percent, or greater, fructose on a dry solids basis.

The chromatographic process for increasing the level of fructose provided by hydrolysis of sucrose or by isomerization of dextrose, involves the evaporation or concentration of a fructose containing syrup to a dry solids (d.s.) content of about 60 weight percent on a total weight basis. The syrup is subjected to a fractionation step, after dilution with water, in an absorption column which provides a raffinate which must be handled. The product must be carbon refined, and ion exchange refined, whereupon it is subjected to a final evaporation to a dry solids content of about 77 weight percent. The end product has about 55 percent or more fructose, d.s.b. However, this chromatographic process has certain disadvantages and it would be desirable to avoid the fractionation step and the final ion exchange refining step. Further, it would be desirable to avoid the production of raffinate and to minimize the microbiological problems associated with the chromatographic process. It would also be desirable to reduce the cost of the chromatographic process and to limit the energy requirements of such process.

A process for the manufacture of high fructose syrup is disclosed in U.S. Pat. No. 4,395,292 issued July 26, 1983. The process disclosed in this patent involves the use of a molecular exclusion column to remove dextrose and higher saccharides from the syrup. However, this process has the disadvantages which are attendant to the chromatographic process.

U.S. Pat. No. 3,704,168 issued Nov. 28, 1972 is directed to a process for the crystallization of glucose, fructose, or a mixture of glucose and fructose. The patent teaches the formation of a solution in which a mixed sugar is present containing glucose and fructose which is dissolved in a combination medium comprising a liquid polyhydric alcohol, and a liquid monohydric alcohol having a water content of less than 5 percent. The solution is held under supersaturated conditions and a seed crystal is added to effect crystallization. However, this process is costly and does not have the advantages of the present invention.

U.S. Pat. No. 4,371,402 issued Feb. 1, 1983 is directed to a process for preparation of fructose containing solid sugar from a fructose containing liquid sugar by the steps of dehydration, aging and solidification. The process disclosed involves using an azeotropic organic solvent and a dehydration step utilizing a stream of gas. The process is expensive and not of great advantage in the commercial production of high fructose containing syrups.

British Pat. No. 2,087,400 issued May 31, 1984, is directed to a process for the production of a syrup having a high fructose concentration. In accordance with the teachings of this application, a glucose syrup is mixed with a crystallization product containing dissolved fructose and glucose, as well as glucose crystals, to form a homogeneous solution. The solution is then isomerized and evaporated whereupon it is seeded with glucose crystals. The seeded mixture is cooled to crystallize glucose, which is recycled and mixed with the glucose syrup. However, this process does not provide good results in commercial practice.

It is a principal object of this invention to provide an improved process for enriching the fructose content of a fructose containing syrup.

A further object of the invention is to provide an improved method of manufacturing high fructose syrup having at least about 55 percent or more fructose d.s.b.

A still further object of this invention is the provision of a more efficient, lower cost manufacturing process for high fructose syrups.

Other objects and advantages of the invention will become apparent by reference to the following description.

Throughout the specification and claims all ratios and percentages are stated on a weight basis, temperatures are in degrees Celsius and pressures are in KPascals over (or under) ambient unless otherwise indicated.

SUMMARY OF THE INVENTION

In one aspect the present invention is a process for manufacturing an enriched fructose syrup comprising the steps of:
(a) providing a fructose containing feed syrup having a dry solids content between about 75 and 89 percent with the dry solids including at least about 92 percent monosaccharides, on a dry solids basis, said monosaccharides being primarily composed of dextrose and fructose:
(b) establishing a feed syrup temperature appropriate for crystallization of dextrose crystals;
(c) seeding said feed syrup with a dextrose seed crystal;
(d) allowing said feed syrup to crystallize for at least about 8 hours to form a massecuite comprising dextrose crystals and mother liquor;
(e) mixing a fructose containing diluent syrup comprising from about 35 percent to about 50 percent dry solids, the dry solids of said diluent syrup containing, on a dry solids basis, from about 35 percent to about 50 percent fructose, with said massecuite in an amount sufficient to enhance separation of the dextrose crystals from the mother liquor in said massecuite; and
(f) separating said dextrose crystals from said mother liquor to yield a crystalline product and an enriched fructose syrup in which the fructose content, on a dry solids basis, is at least about 1.1 times the original fructose content of the initial fructose containing feed syrup.

In other embodiments described in detail below, the invention provides a process for producing dextrose monohydrate or anhydrous alpha dextrose.

In an especially advantageous aspect, this invention is a process for producing an enriched fructose syrup containing at least about 55% or more fructose on a dry solids basis.

DESCRIPTION OF THE INVENTION

The present invention contemplates the manufacture of an enriched fructose syrup, preferably containing about 55 percent fructose, or higher, dry solids basis (d.s.b.). In accordance with the invention, a feed syrup is prepared or provided having at least about 92 percent, d.s.b., monosaccharides, preferably at least about 96, d.s.b., percent monosaccharides, and in which said monosaccharides are primarily or predominantly (e.g., at least about 90, preferably at least about 95 percent) composed of dextrose and fructose. The amount of higher saccharides present should be less than about 8 percent, d.s.b. in the feed syrup, fructose will typically constitute between about 35 percent and 50 percent of the monosaccharide content, and dextrose will typically constitute between about 45 percent and 65 percent of the monosaccharide content. The dry solids content of the indicated feed syrup should be between about 75 percent and about 89 percent based upon the total weight of said feed syrup.

In order to achieve the results of the invention, the dry solids content of the feed syrup is an important consideration and at dry solids contents higher than about 89 percent, the syrup becomes too viscous and the rate of dextrose crystallization becomes undesirably low. At lower dry solid levels, that is below about 75 percent, the desired extent of crystallization of the dextrose does not occur. The best results have been achieved when the dry solids content of the syrup is between about 77 percent and about 81 percent (preferably about 79 percent) for dextrose monohydrate and between about 83 percent and about 87 percent (preferably about 85 percent) for anhydrous dextrose.

The level of monosaccharides in the syrup is also important for achieving the desired results and the process becomes inefficient at monosaccharide levels below about 92 percent, d.s.b. Present commercial processes for making high monosaccharide content syrups are known and readily provide levels of dextrose and fructose within the above indicated ranges.

The feed syrup which is to be treated can be prepared by isomerization of a dextrose syrup, derived from any starch source, preferably corn starch, or by hydrolysis of a sucrose solution to prepare invert sugar. The processes for isomerizing dextrose syrup and hydrolyzing a sucrose solution are well known in the art, and need not be further described. However, these known processes should be carried out to provide a feed syrup for treatment which has a dry solids level and which comprises monosaccharides, including dextrose and fructose, within the above prescribed ranges. Generally, the syrup provided by these processes will have to be evaporated to provide the dry solids content specified.

The dextrose and fructose containing feed syrup is then cooled to a temperature selected to provide dextrose monohydrate or anhydrous alpha dextrose crystals. To provide dextrose monohydrate, cooling is effected to between about 15° C. and 24° C., and the syrups seeded, preferably with dextrose monohydrate seed crystals, in accordance with usual seeding practices. To provide anhydrous alpha dextrose, the syrup is cooled to between about 24° C. and about 55° C., preferably between about 26° C. and about 35° C., and the syrup is seeded preferably with anhydrous alpha dextrose seed crystals. Generally, the seed crystals employed will be such that at least about 55 percent of the crystals will pass a 200 mesh screen and said seed crystals will typically be employed at a level corresponding to from about 1 to about 50 (preferably from about 1 to about 10) percent based upon the weight of the monosaccharides in the syrup. The temperature for crystallization is related to the dry solids content so as to provide a desired viscosity and crystallizing condition. The crystallization should be carried out for a time sufficient to provide a massecuite comprising crystallized dextrose monohydrate or anhydrous alpha dextrose and a mother liquor. The time required for crystallization is dependent on the nature of the fructose feed syrup and upon the fructose content desired for the finished enriched fructose syrup. In general, the crystallization will be carried out for at least about 8 hours. In those instances where the fructose content of the feed syrup is relatively low (e.g. between about 35 and about 45 percent d.s.b.) and wherein the fructose level desired in the ultimate enriched syrup product is in excess of about 50 percent, d.s.b., the crystallization will generally be conducted for at least about 24 hours. Longer periods of time for crystallization will increase crystal yield but it has been found that times in excess of about 48 hours usually do not provide substantially increased fructose levels in the mother liquor. Of course, the length of crystallizing times affects the productivity of the process which, in turn, affects the size of crystallizing tanks and capital investment which are required for practical commercial practice. In any event, the crystallization should be carried out until the mother liquor has a fructose content (d.s.b.) which is at least 10 percent higher (i.e., at least 1.1 times) than that of the starting feed syrup. Thus, for example, when the starting feed syrup has an initial fructose content of about 40 percent, d.s.b., the crystallization will be conducted until the mother liquor has a fructose content of at least about 44 percent, d.s.b. In an especially preferred embodiment, the crystallization will be conducted until the mother liquor has a fructose content of at least about 55 percent, d.s.b., regardless of the initial fructose content of the starting feed syrup material.

After crystallization, the massecuite, which is relatively viscous and difficult to handle and filter, and which does not permit the ready separation of the crystals from the mother liquor, is mixed with a fructose containing diluent syrup comprising between about 35 percent to about 50 percent fructose on a dry solids basis and about 35 percent to about 50 percent total dry solids on a total weight basis. The fructose containing diluent syrup is added for two purposes. The first purpose is to reduce the viscosity of the massecuite to allow easy separation of dextrose crystals from the mother liquor which is the desired enriched fructose product. The second purpose is to control the level of fructose in the enriched fructose product.

The fructose containing diluent syrup added after crystallization will preferably contain between about 50 percent and about 65 percent (d.s.b.) dextrose in addition to fructose and a low level of higher saccharides. A preferred fructose containing diluent syrup for use in reducing the viscosity of the massecuite is isomerized dextrose syrup that contains between about 40 percent to about 45 percent (d.s.b.) fructose and between about 42 percent and about 48 percent dry solids. The fructose containing diluent syrup may be fructose containing feed syrup that has been diluted or obtained from a process stream prior to evaporation. The use of such a syrup allows production of a maximum amount of enriched fructose syrup via a crystallization process.

The crystallization can be used to produce the highest possible fructose content mother liquor which is then blended with the fructose containing diluent syrup which has a lower content of fructose. The resulting enriched fructose syrup can be produced at maximum capacity. The blending allows adjustment to yield the desired fructose level in the enriched fructose syrup.

An advantage of using the fructose containing diluent syrup to reduce the viscosity of the massecuite is that the residual dextrose in the diluent syrup is sufficiently close to saturation to provide a driving force to keep the dextrose in the massecuite in the crystalline form. If water were used as a diluent, the dextrose crystals in the massecuite would dissolve in time and not allow for separation of dextrose crystals and mother liquor. The resulting mother liquor would not be enriched to the desired degree in fructose.

The amount of fructose containing diluent syrup added to the massecuite is in the range of from about 20 parts to about 50 parts, preferably from about 25 parts to about 35 parts, per 100 parts of the massecuite, depending upon the fructose and dry solids content of said diluent syrup and upon the final fructose level desired in the enriched syrup.

In this invention, the fructose containing diluent syrup is added to the crystallized feed syrup, the massecuite, to reduce the viscosity of the massecuite and to enhance the separation of dextrose crystals from the mother liquor, thereby providing the desired enriched syrup following removal of said dextrose crystals.

The recovered syrup, as before indicated, has an increased fructose content relative to that of the initial feed syrup and preferably comprises more than about 55 percent of fructose on a dry solids basis. If desired, the recovered syrup can comprise up to about 70 percent fructose on a dry solids basis.

The temperature conditions and seed in the crystallization step determine whether anhydrous alpha dextrose crystals are formed or whether dextrose monohydrate crystals are formed. As indicated, the dextrose monohydrate crystals are formed in the temperature range of 15° C. to 24° C., whereas the anhydrous alpha dextrose crystals are formed at a temperature between about 24° C. and about 55° C., preferably between about 26° C. and 35° C.

The dextrose from the process can be harvested as a crystalline final product, used as seed crystals or can be desirably recycled back to a process step for the preparation of the isomerized glucose so that the percentage of monosaccharides in the resulting isomerized product is raised. Generally, it has been found that this recycling can be used to raise the monosaccharide content of the dry solids in the isomerized glucose by 1 percent to 2 percent and to thereby make the resulting overall process relatively more efficient.

The hydrolysis of a sucrose solution also gives a highly desirable product for the practice of the invention. More particularly, the syrup which is provided has a very low level of higher saccharides and is free from maltose, which serves as a crystallization depressant.

EXAMPLE 1

A dextrose syrup was used, which had been isomerized, and which provided a fructose containing syrup as follows:
43.2% fructose d.s.b.
53.2% dextrose d.s.b.
3.6% higher saccharides d.s.b.
79% dry solids The isomerized syrup was cooled to 21° C. and seeded with dextrose monohydrate crystals having more than 80 percent of the crystals passing through a 200 mesh screen. The seed crystals were added at a level of 35 percent of the sugars present in the syrup. The seeded syrup was stirred for 75 hours to develop dextrose monohydrate crystals and an enriched mother liquor comprising 62.1 percent fructose d.s.b.

A fructose containing syrup, which was an isomerized dextrose syrup, was added as a diluent to the massecuite. The isomerized dextrose syrup contained 43.2 percent fructose, 53.2 percent dextrose, 3.6 percent higher saccharides and a total dry solids of 45 percent. The isomerized dextrose diluent syrup was added at a level of 30 parts per 100 parts of massecuite. The massecuite viscosity was reduced and the concentration of fructose in the resulting diluted mother liquor was reduced to 55 percent fructose.

The dextrose crystals were separated from the mother liquor by vacuum filtration to provide an enriched fructose syrup product containing 54.4 percent fructose and 41 percent dextrose and a dry solids content of 75 percent.

A portion of the wet dextrose crystal cake (87.1 percent dextrose, 11.8% fructose and 1.1% higher saccharides) was recycled to provide seed to the crystallization step and the remainder was recycled to a dextrose syrup feed stream where the crystals were dissolved and then isomerized.

EXAMPLE 2

In accord with this example, a commercially available dextrose syrup sold under the trademark STALEYDEX 95, and having a dextrose level of 96 (d.s.b.) percent, total solids of 71 percent and an oligosaccharide level of 4 percent (d.s.b.), is diluted to 28 percent dry solids on a total weight basis, and placed in a tank. In the tank is also placed dextrose monohydrate recovered from the process of the invention to provide a total saccharide solids level of 33 percent on a total weight basis. This effects an increase of 1 percent in the amount of monosaccharides. The mixture is ion exchanged and evaporated to a dry solids level of 45 percent, in accordance with normal commercial practice, and isomerized with an isomerizing enzyme. The product of the isomerization is treated with carbon and ion exchanged, again in accordance with commercial practice. The resulting syrup is then evaporated to 79 percent dry solids. This material is treated in accordance with Example 1 and the recovered dextrose monohydrate is returned, in part, to the tank for mixing with the dextrose syrup. As before indicated, it is highly advantageous to utilize this dextrose to increase the percentage of monosaccharides in the system giving an improved result. In the case, where a dry monohydrate dextrose is desired as secondary product, the dextrose crystals are air dried to a 91 percent dry solids level.

Evaporation may be provided to concentrate the enriched fructose syrup to the saccharide solids level desired for the end product syrup, usually 77 percent total saccharide solids on a total syrup weight basis.

EXAMPLE 3

In accord with this example, crystallization is carried out under conditions which will form anhydrous alpha dextrose crystals. A high fructose corn syrup, commercially available as ISOSWEET TM 100 is evaporated to provide a syrup containing 87 percent dry solids. Of the dry solids, 43 percent is fructose and 53 percent is dextrose, with the remainder being higher saccharides. The syrup comprises 96 percent monosaccharides on a dry solids basis. The isomerized syrup is seeded with anhydrous alpha dextrose seed crystals and crystallized at 30° C. for 48 hours. Stirring is carried out during crystallization in accordance with usual practices.

After crystallization, a 42 percent (d.s.b.) fructose syrup at 45 percent dry solids is added as a diluent at a ratio of 30 parts per 100 parts of the massecuite. The addition of the fructose containing diluent syrup substantially reduces the viscosity of the mixture.

The mixture is centrifuged to provide a cake which is dried to remove water and to yield anhydrous alpha dextrose which can be sold as an item of commerce. The recovered mother liquor is an enriched fructose syrup containing 55 percent fructose (d.s.b.).

EXAMPLE 4

In this example an isomerized dextrose syrup having the following composition:
  42.3% fructose d.s.b.
  56.4% dextrose d.s.b.
  1.3% higher saccharides d.s.b.
  79% dry solids
was used as a fructose containing feed syrup. The fructose containing feed syrup was cooled to 18° C. divided into three batches and seeded with 1 percent, 25 percent or 35 percent dextrose monohydrate based on total sugar solids in the feed syrup.

The seeded syrup was stirred for 48 hours to develop dextrose monohydrate crystals. At the end of 48 hours, the three batches were each further sub-divided into three batches. Three different fructose containing diluent syrups were added to reduce the viscosity of the massecuite to allow easy separation of dextrose crystals. The fructose containing diluent syrups contained either 35 percent, 40 percent and 45 percent dry solids and had the same saccharide composition as the fructose containing feed syrup. The syrups were added at 32 parts, 28 parts, or 25 parts per 100 parts of massecuite, respectively. The reduced viscosity massecuites were then separated from the modified mother liquor by vacuum filtration. The resulting modified mother liquor or enriched fructose syrups contained from 50.1 to 57.5 percent fructose (d.s.b.).

The experimental results obtained are shown in Table I. The data shows the composition of the enriched syrup product ranges from 50.1 percent to 57.5 percent fructose (d.s.b.) after 48 hours crystallization and after mixing with the fructose containing diluent syrup. Final dry solids content of the enriched syrup ranges from 60.0 percent to 68.5 percent. In commercial practice such syrups would typically be evaporated until the solids content was in the range of 75 percent to 80 percent.

The process of the invention provides a simple and efficient way for increasing the fructose content in a fructose containing syrup which has many advantages over the use of the chromatographic techniques now employed. The raffinate stream is omitted and valuable crystalline dextrose by-products are also obtained.

The various features of the invention which are believed to be new are set forth in the following claims.

TABLE I
FRUCTOSE ENRICHMENT AS AFFECTED BY AMOUNT OF DEXTROSE SEED AND PERCENT DRY SOLIDS IN FRUCTOSE CONTAINING DILUENT SYRUP

| | PERCENT | | |
|---|---|---|---|
| Solids Level in Fructose Containing Diluent Syrup | 35 | 40 | 45 |
| Parts Fructose Containing Diluent Syrup Added per 100 parts Massecuite | 32 | 28 | 25 |
| RUN | | | |
| A. 1 Percent Dextrose Seed Composition of Enriched Syrup | | | |
| Percent Fructose | 55.1 | 56.6 | 56.8 |
| Percent Dextrose | 43.5 | 41.8 | 41.8 |
| Percent Higher Saccharides | 1.4 | 1.6 | 1.4 |
| Percent d.s.* in Syrup | 64.0 | 65.0 | 68.5 |
| B. 25 Percent Dextrose Seed Composition of Enriched Syrup | | | |
| Percent Fructose | 50.1 | 55.4 | 57.5 |
| Percent Dextrose | 48.5 | 43.1 | 40.9 |
| Percent Higher Saccharides | 1.4 | 1.5 | 1.6 |
| Percent d.s.* in Syrup | 60.0 | 64.0 | 63.0 |
| C. 35 Percent Dextrose Seed Composition of Enriched Syrup | | | |
| Percent Fructose | 51.7 | 54.9 | 57.5 |
| Percent Dextrose | 46.9 | 43.6 | 40.9 |
| Percent Higher Saccharides | 1.4 | 1.5 | 1.6 |
| Percent d.s.* in Syrup | 60.0 | 62.5 | 66.5 |

*d.s. = dry solids

What is claimed is:

1. A process for manufacturing an enriched fructose syrup comprising the steps of:
   (a) providing a fructose containing feed syrup having a dry solids content between about 75 and 89 percent with the dry solids including at least about 92 percent monosaccharides, on a dry solids basis, said monosaccharides being primarily composed of dextrose and fructose;
   (b) establishing a feed syrup temperature appropriate for crystallization of the desired form of dextrose crystals;
   (c) seeding said feed syrup with a dextrose seed crystal;
   (d) allowing said feed syrup to crystallize for at least about 8 hours to form a massecuite comprising dextrose crystals and mother liquor;
   (e) mixing a fructose containing diluent syrup comprising from about 35 percent to about 50 percent dry solids, the dry solids of said diluent syrup containing, on a dry solids basis, from about 35 percent to about 50 percent fructose, with said massecuite in an amount sufficient to enhance separation of the dextrose crystals from the mother liquor in said massecuite; and
   (f) separating said dextrose crystals from said mother liquor to yield a crystalline product and an enriched fructose syrup in which the fructose content, on a dry solids basis, is at least about 1.1 times the original fructose content of the initial fructose containing feed syrup.

2. The process of claim 1, wherein said syrup temperature for crystallization (step b) is maintained between about 15° to about 24° C. to yield dextrose monohydrate.

3. The process of claim 2, wherein said fructose containing feed syrup has a dry solids content between about 77 percent to about 81 percent.

4. The process of claim 1, wherein said syrup temperature for crystallization (step b) is maintained at between about 24° to about 55° C. to yield anhydrous alpha dextrose.

5. The process of claim 4, wherein said syrup temperature is maintained at between about 26° to about 35° C.

6. The process of claim 4, wherein said fructose containing feed syrup has a dry solids content between about 83 percent to about 87 percent.

7. The process of claim 1, wherein said enriched fructose syrup contains at least about 55 percent or more fructose on a dry solids basis.

8. The process of claim 1, wherein said crystalline product is dextrose monohydrate.

9. The process of claim 1, wherein said crystalline product is anhydrous alpha dextrose.

10. The process of claim 1, wherein said fructose containing feed syrup is derived from starch.

11. The process of claim 1, wherein said fructose containing feed syrup is derived from a sucrose source.

12. The process of claim 1, wherein said fructose containing diluent syrup comprises, on a dry solids basis, from about 40 percent to 45 percent fructose.

13. The process of claim 1, wherein said fructose containing diluent syrup is added at a level of from about 20 parts to about 50 parts per 100 parts of the massecuite.

14. The process of claim 13, wherein said fructose containing diluent syrup is added at a level of from about 25 parts to about 35 parts per 100 parts of the massecuite.

15. The process of claim 1, wherein said feed syrup is allowed to crystallize for at least 24 hours.

* * * * *